US012730358B2

(12) United States Patent
Sakazume

(10) Patent No.: US 12,730,358 B2
(45) Date of Patent: Sep. 8, 2026

(54) LENS HOOD

(71) Applicant: SOMAR CORPORATION, Tokyo (JP)

(72) Inventor: Naoki Sakazume, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 281 days.

(21) Appl. No.: 18/579,638

(22) PCT Filed: Jul. 15, 2022

(86) PCT No.: PCT/JP2022/027840
§ 371 (c)(1),
(2) Date: Jan. 16, 2024

(87) PCT Pub. No.: WO2023/002942
PCT Pub. Date: Jan. 26, 2023

(65) Prior Publication Data

US 2024/0337902 A1 Oct. 10, 2024

(30) Foreign Application Priority Data

Jul. 21, 2021 (JP) ................................ 2021-120361

(51) Int. Cl.
*G03B 11/04* (2021.01)
*G02B 1/111* (2015.01)

(52) U.S. Cl.
CPC ............ *G03B 11/045* (2013.01); *G02B 1/111* (2013.01)

(58) Field of Classification Search
CPC ....... G03B 11/045; G03B 11/04; G02B 1/111; G02B 1/118; G02B 5/00; G02B 5/003;
(Continued)

(56) References Cited

U.S. PATENT DOCUMENTS 5,909,314 A * 6/1999 Oka .......................... G02B 1/12 427/167
6,116,330 A 9/2000 Salyer
(Continued)

FOREIGN PATENT DOCUMENTS

EP 4082891 A1 * 11/2022 ............. B32B 17/10
JP 2003-105235 A 4/2003
(Continued)

OTHER PUBLICATIONS

JP 2020097730; Inoguchi et al. Surface Antireflection Coating for Atomization Coating, and Surface Antireflection Coated Film (Year: 2020).*
(Continued)

*Primary Examiner* — Bumsuk Won
*Assistant Examiner* — Rahman Abdur
(74) *Attorney, Agent, or Firm* — Rankin, Hill & Clark LLP

(57) ABSTRACT

A lens hood has an antireflection film for shielding an unnecessary light entering a photographic lens of a camera. Here, (A) indicates a resin component, (B) unevenness forming particles, (B1) inorganic-type small particles having a particle diameter (d1) of 0.05 μm to 0.4 μm, (B2) inorganic-type large particles having a particle diameter (d2) of 2 μm to 6 μm, and (C) a diluent solvent. The antireflection film is a membrane formed from a liquid composition via spray coating and has a thickness of 2 to 40 μm. The liquid composition has at least (A), (B) and (C). The (B) is contained in an amount of 20% by mass to 60% by mass in 100% by mass of a total amount of the total solid content in the composition. The (B) contains (B1) and (B2) in an amount of 90% by mass or more. A mass ratio of (B2) to (B1):1 is 1.8 to 3.3.

15 Claims, 2 Drawing Sheets

(58) Field of Classification Search
CPC ... C08K 3/04; C08K 3/36; C08K 9/02; C08K 2201/005; C09D 7/61; C09D 7/66
USPC .......................................................... 359/611
See application file for complete search history.

(56) References Cited

U.S. PATENT DOCUMENTS

| | | | |
|---|---|---|---|
| 10,254,628 | B2 | 4/2019 | Ono |
| 2012/0251095 | A1 | 10/2012 | Ono et al. |
| 2016/0131961 | A1 | 5/2016 | Ito |
| 2017/0146888 | A1 | 5/2017 | Ono |
| 2023/0046475 | A1 | 2/2023 | Sakamura et al. |

FOREIGN PATENT DOCUMENTS

| | | | |
|---|---|---|---|
| JP | 2012-194514 | A | 10/2012 |
| JP | 2013-054393 | A | 3/2013 |
| JP | 2016-51012 | A | 4/2016 |
| JP | 2016-090950 | A | 5/2016 |
| JP | 2018-52804 | A | 4/2018 |
| JP | 2018-144852 | A | 9/2018 |
| JP | 2019-200392 | A | 11/2019 |
| JP | 2020-097730 | A | 6/2020 |
| WO | 2011/062055 | A1 | 5/2011 |
| WO | 2021/132585 | A1 | 7/2021 |

OTHER PUBLICATIONS

Sakamura et al. (WO 2021132585) Black Light Shielding Member (Year: 2021).*

Tanaka Naohiro, JP 2018144852, Adhesion Prevention Member, Container, and Manufacturing Method of Adhesion Prevention Member (Year: 2018).*

CN 113574420 Fumiaki et al. Laminated Body for Anti-reflection Film, Anti-reflection Film and Manufacturing Method (Year: 2020).*

WO 9845734 Tomokazu et al. Antireflection Films and Image Display Device (Year: 1998).*

International Search Report Corresponding to International Application No. PCT/JP2022/027840 dated Oct. 11, 2022, 3 pages.

Japanese Office Action Corresponding to JP Application No. 2021-120361, dated Jun. 24, 2025, 10 pages.

* cited by examiner

LENS HOOD

This application is a U.S. national phase filing under 35 U.S.C. § 371 of PCT Application. No. PCT/JP2022/027840, filed on Jul. 15, 2022, which is hereby incorporated by reference in its entirely by reference.

TECHNICAL FIELD

The present invention relates to a lens hood, which is attached to a photographic lens of a camera, for shielding an unnecessary light entering to the photographic lens.

BACKGROUND ART

There is known a lens hood in a circular or flower shape, etc. attached to an end (the side of a subject to be photographed) of a photographic lens of a camera so as to prevent a light entering obliquely at a larger angle exceeding a photographing angle of view to a photographic lens (hereinafter, also referred to as "an unnecessary light") on a sunny day with strong sunshine. On a surface of an inner wall of the lens hood, a black antireflection film is formed to suppress reflection of a light in some cases (for example, Patent Document 1).

RELATED ART DOCUMENTS

Patent Document

Patent Document 1: Japanese Patent Unexamined Patent Publication (Kokai) No. 2016-51012

SUMMARY OF THE DISCLOSED SUBJECT MATTER

Because of characteristics of the product, the whole appearance of a lens hood can be seen by users when holding it in hands, so that a high appearance quality is sometimes required to the antireflection film. Specifically, it is sometimes required to be provided with a black-coated membrane with high designability (for example, an uneven membrane).

The present invention was made in consideration with the circumstances above. The present invention has an object thereof to provide a lens hood provided with an antireflection film having high designability and effective to shield an unnecessary light entering to a photographic lens of a camera.

The present inventors conducted studies diligently and found that fulfilling the requirements below is effective to form an antireflection film having high designability and effective for shielding an unnecessary light entering to a photographic lens of a camera.

To use a liquid composition having a specific composition comprising a predetermined ratio of unevenness forming particles comprising, in a range of a predetermined mass ratio, large and small inorganic particles having particle diameters in predetermined ranges.

To form a membrane having a predetermined thickness by using a liquid composition having the specific composition above by spray coating.

Based on these newly acquired knowledge, the present inventors completed the invention as provided below and attained the object above.

Below, (A) indicates a resin component, (B) unevenness forming particles, (B1) inorganic small particles having a particle diameter ($d_1$) of 0.05 μm or more and 0.4 μm or less, (B2) inorganic large particles having a particle diameter ($d_2$) of 2 μm or more and 6 μm or less, and (C) diluent solvent.

According to the present invention, there is provided a lens hood, which is attached to a photographic lens on a side of a photography subject, for shielding an unnecessary light entering to the photographic lens: wherein an inner wall surface of a hood body has an antireflection film;

the antireflection film is formed of a membrane formed from a liquid composition by spray coating and has a thickness of 2 μm or more and 40 μm or less;

the liquid composition comprises at least (A), (B) and (C): wherein (B) is contained in an amount of 20% by mass or more and 60% by mass or less in a total amount of 100% by mass of all solid content in the composition; and (B) comprises (B1) and (B2) in an amount of 90% by mass or more, and a mass ratio of (B2) with respect to (B1):1 is 1.8 or more and 3.3 or less.

According to the present invention, there is provided an antireflection film to be formed on an inner wall surface of a lens hood, configured by a membrane formed from a liquid composition by spray coating having a thickness of 2 μm or more and 40 μm or less: wherein The liquid composition comprises at least (A), (B) and (C): wherein (B) is contained in an amount of 20% by mass or more and 60% by mass or less in a total amount of 100% by mass of all solid content in the composition;

(B) comprises (B1) and (B2) in an amount of 90% by mass or more, and a mass ratio of (B2) with respect to (B1): 1 is 1.8 or more and 3.3 or less;

The liquid composition above may include modes below.

The (B2) preferably contains silica.

Silica preferably includes complex silica colored black with a colorant.

The (B1) preferably contains carbon black.

Viscosity at 25° C. is preferably 1 mPa·s or more and 30 mPa·s or less.

The antireflection film above may include modes below.

It is preferable that an outermost surface of a surface formed with a membrane has glossiness of less than 1% against an incident light with an incident angle of 60° (hereinafter, also simply referred to as "60°-glossiness"), glossiness of less than 5% against an incident light with an incident angle of 85° (hereinafter, also simply referred to as "85°-glossiness"), reflectance of 4% or less against a light having a wavelength of 550 nm (hereinafter, also simply referred to as "reflectance"), an L value in CIELAB color space system in SCE method of 22 or less, and an optical density of 1.0 or more.

It is preferable that an outermost surface of a plane formed with a membrane has a maximum height Rz of 7 μm or more based on JIS B0601:2001 (hereinafter, also simply referred to as "Rz"), an average length Rsm of contour curve elements (hereinafter, also simply referred to as "Rsm") of 80 μm or more, a skewness Rsk of a contour curve (hereinafter, also simply referred to as "Rsk") of 0.3 or less, and Kurtosis Rku of a contour curve ((hereinafter, also simply referred to as "Rku") of 3 or more.

According to the present invention, there is provided a lens hood provided with an antireflection film, which has high designability and is effective for shielding an unnecessary light entering to a photographic lens of a camera.

EXEMPLARY MODE FOR CARRYING OUT THE DISCLOSED SUBJECT MATTER

Below, the best modes for carrying out the invention will be explained. However, the present invention is not limited to the modes below and also includes those obtained by suitably modifying or improving the modes explained below based on ordinary knowledge of persons skilled in the art within the scope of the present invention.

As to a range of value in the present specification, an uppermost value or a lowermost value described in certain value ranges may be replaced by values indicated in the examples.

In the present specification, when there are a plurality of kinds of substances falling under each component in a composition, a content ratio or a content in each component in the composition indicates a content ratio or a content of a total of the plurality of kinds of substances being in the composition unless otherwise mentioned.

Figure 1:
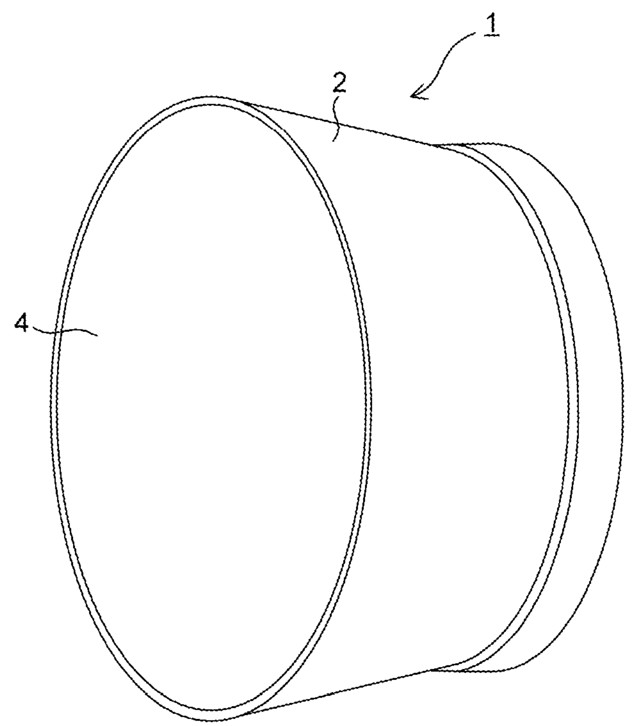
FIG. 1 A perpendicular view showing a lens hood schematically according to one mode of the present invention.
Figure 2:
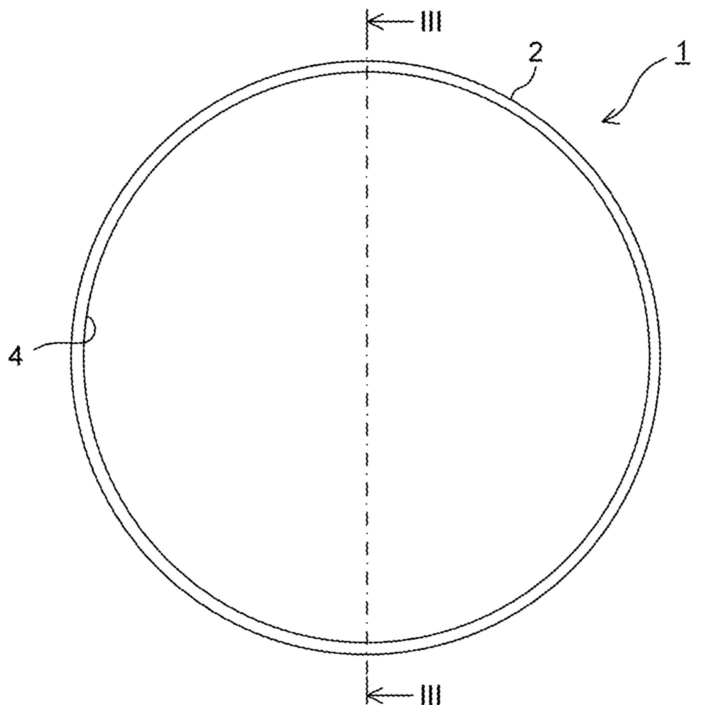
FIG. 2 A plane view of a lens hood shown in FIG. 1.
Figure 3:
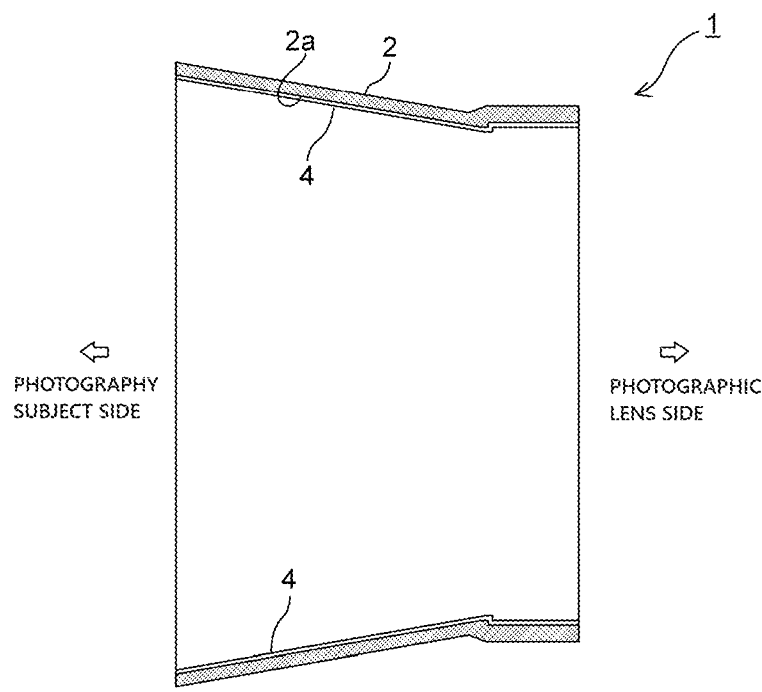
FIG. 3 A sectional view along a line III-III in FIG. 2.

As shown in FIG. 1 to FIG. 3, a lens hood 1 according to one mode of the present invention is used in a way, where a rear end thereof is attached to an end of a photographic lens (on the side of a subject to be photographed), and mainly comprises a cylindrical hood body 2 and an antireflection film 4 formed on an inner wall surface 2*a* of the hood.

The hood body 2 is formed, for example, of a resin or metal, such as an aluminum light alloy. A shape thereof differs normally depending on an angle of view of a photographic lens, to which the hood is attached. From the functional object of shielding an unnecessary light and not shielding necessary lights for photographing (effective lights used for imaging a subject image in an angle of view of the photographic lens), in the case of attaching to a telephoto lens or a lens with a large diameter, generally it is a simple cylindrical shape of circle, etc. (refer to FIG. 1 to FIG. 3). On the other hand, in the case of attaching to a standard lens, mono-focal lens, furthermore, a wide-angle lens or fish-eye lens, to fulfill the functional object above, a shape like a flower (a tulip shape), which the cylinder is partially cut (not shown) is applied in some cases. In any cases, the hood body 2 basically has a cylindrical shape.

In one mode, illustration thereof is omitted but a rear end of the hood body 2 (the photographic lens side) may be provided with a bayonet pawl to engage with a bayonet groove (not shown) formed on an end portion (the photography subject side) of the photographic lens. As a result that the bayonet pawl of the hood body 2 engages with the bayonet groove on the photographic lens, the lens hood 1 can be attached to the end of the photographic lens.

An antireflection film 4 is stacked on an inner wall surface 2*a* of the hood body 2. The antireflection film 4 serves as explained below. Among lights entering from the end of the hood body 2 (the photography subject side), a light not reaching to the inner wall surface 2*a* of the hood body 2 (effective light. Let's call it "an incident light a") passes an opening of the lens hood 1 and enters the photographic lens. On the other hand, among the lights entering to the hood body 2, a light reaching to an inner wall surface 2*a* (unnecessary light. Let's call it "an incident light b") hits the antireflection film 4 formed on the inner wall surface 2*a*. When an antireflection film is not formed on the inner wall surface, the light reached to the inner wall surface reflects and enters the photographic lens as an internal reflection light, which is irrelevant to an image. Such internal reflection light is a cause of flare or ghost, etc., which are elements to deteriorate the image. On the other hand, as in one mode, when the antireflection film 4 is formed on the inner wall surface 2*a*, it is possible to reduce internal reflection of the incident light b entering obliquely to the hood body 2, consequently, an internal reflection light, which adversely affect the image, reduces, so that arising of flare or ghost can be prevented.

The antireflection film 4 according to one mode as shown in FIG. 1 to FIG. 3 is configured by a membrane formed from a liquid composition.

<Liquid Composition>

A liquid composition according to one mode (hereinafter, also simply referred to as "a composition") is used for forming a membrane on an inner wall surface 2*a* of the hood body 2 (hereinafter, also simply referred to as "an object to be coated") and comprises (A) a resin component, (B) unevenness forming particles and (C) a diluent solvent. The (B) used for forming a composition comprises (B1) small particles having a particle diameter ($d_1$) of 0.05 μm or more and 0.4 μm or less and (B2) large particles having a particle diameter ($d_2$) of 2 μm or more and 6 μm or less, and it may also comprise components other than (B1) and (B2). Namely, a composition according to one mode is configured by comprising (A), (B1), (B2) and (C). A composition according to one mode may be used suitably in spray coating when applying to a surface of an object to be coated.

—(A)—

(A) to be used for forming a composition serves as a binder of (B). A material of (A) is not particularly limited and either of a thermoplastic resin and thermosetting resin may be used. As a thermosetting resin, for example, an acrylic-type resin, urethane-type resin, phenol-type resin, melamine-type resin, a urea-type resin, diallyl phthalate-type resin, unsaturated polyester-type resin, epoxy-type resin and alkyd-type resin, etc. may be mentioned. As a thermoplastic resin, a polyacrylic ester resin, polyvinyl chloride resin, butyral resin and styrene-butadiene copolymer resin, etc. may be mentioned. In terms of heat resistance, moisture resistance, solvent resistance and surface hardness of an uneven membrane to be formed, a thermosetting resin is preferably used as (A). As a thermosetting resin, when considering flexibility and strength of a membrane to be formed, an acrylic resin is particularly preferable. As (A), one kind may be used alone or two or more kinds may be combined for use.

A content (a total amount) of (A) is not particularly limited, however, when considering a blending balance with other components, it is preferably 5% by mass or more, more preferably 15% by mass or more, furthermore preferably 25% by mass or more and preferably 50% by mass or less, more preferably 45% by mass or less and furthermore preferably 40% by mass or less with respect to a total amount (100% by mass) of total solid content in the composition.

—(B)—

It is essential that the (B) to be used for forming a composition comprises a plurality of unevenness forming particles having different sizes in combination. Particularly, (B1) small particles and (B2) large particles are combined to be used as (B). For example, in the case of composing (B) only of two kinds of unevenness forming particles having different sizes (namely, (B1) and (B2)), a particle diameter ($d_2$) of (B2) is preferably 10 times or more, more preferably 15 times or more a particle diameter ($d_1$) of (B1) and preferably 40 times or less and more preferably 35 times or less. When using as (B) three or more kinds of unevenness forming particles having different sizes, a particle diameter ($d_{max}$) of unevenness forming particles with a maximum particle diameter and a particle diameter ($d_{min}$) of unevenness forming particles with a minimum particle diameter may be adjusted to have the relationship above (namely, ($d_{max}$) is preferably 10 times or more, more preferably 15 times or more the size of ($d_{min}$) and preferably 40 times or less and more preferably 35 times or less the size of ($d_{min}$)).

In one mode, ($d_1$) is preferably 0.05 μm or more, more preferably 0.1 μm or more and preferably 0.4 μm or less and more preferably 0.3 μm or less. ($d_2$) is preferably 2 μm or more, more preferably 3 μm or more and preferably 6 μm or less, more preferably 5 μm or less and furthermore preferably 4 μm or less.

A particle diameter ($d_1$) of (B1) and a particle diameter ($d_2$) of (B2) are a median diameter based on volume measured by a laser diffraction/scattering particle size distribution measuring apparatus.

In one mode, a mass ratio of (B2) in (B) is, with respect to (B1):1, preferably exceeding 1.75, more preferably 1.8 or more and preferably less than 3.58 and more preferably 3.3 or less. The present inventors found that by using (B1) and (B2) having the specific ranges of particle diameters as explained above combined in a range of this mass ratio, one particle (B1) is easily buried between adjacent two particles (B2) in a membrane to be formed. As a result, low glossiness and low reflectivity on the membrane surface can be realized and a degree of blackness becomes high (an L value becomes low).

A total content (total amount) of (B1) and (B2) in (B) is preferably 90% by mass and more preferably 95% by mass. An upper limit thereof is not particularly limited and is 100% by mass. Namely, in one mode, (B1) and (B2) may be contained preferably 90% by mass or more in 100% by mass of (B).

A content (total amount) of (B) with respect to a total amount (100% by mass) of total solid content in the composition is preferably 20% by mass or more, more preferably 25% by mass or more, furthermore preferably 30% by mass or more and preferably 60% by mass or less, more preferably 50% by mass, furthermore preferably 45% by mass or less and particularly preferably 40% by mass. When a total amount of (B) is less than 20% by mass, disadvantages of an increase of glossiness and optical density shortage are caused, while when exceeding 60% by mass, (A) in a formed coating film is decreased relatively, which results in a disadvantage that a coating film falls off from an object to be coated.

As (B2), either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and carbon, etc. may be mentioned. They may be used alone or in combination of two or more kinds.

To obtain more excellent characteristics, it is preferable to use inorganic-type particles as (B2). By using inorganic-type particles as (B2), a lower glossy and higher light-shielding membrane can be formed easily. As inorganic-type particles to be used as (B2), silica is preferable. A shape of (B2) is not particularly limited but it is preferable to use particles having a narrow particle distribution having a CV (Coefficient of Variation) value of, for example, 15 or less (a sharp product) to realize lower glossiness, lower reflectance and a lower L value on a membrane surface to be formed. The CV value is a numerically expressed degree of spread of a particle diameter distribution (variation of particle diameters) with respect to an average value of a particle diameter (calculated average particle diameter). When using a particle as above, a chance of contacting between (B2) and (B1) increases in a membrane to be formed so as to realize furthermore lower glossiness, lower reflectance and a lower L value on the membrane surface.

Also, in order to furthermore decrease glossiness on the membrane surface to be formed, a particle in indefinite form as (B2) is preferably used. It is particularly preferable to use a porous indefinite-shaped silica particle as (B2). When using particles as above as (B2), lights refract repeatedly on the surface and inside (B2) when formed into a membrane, consequently, a glossiness on the membrane surface can be furthermore reduced.

In one mode, in order to suppress reflection of lights on a surface of a membrane to be formed, (B2) may be colored black by using an organic-type or inorganic-type colorant. As a material therefor, composite silica, conductive silica and black silica, etc. may be mentioned.

As composite silica, for example, what obtained by synthesizing carbon black (hereinafter, also simply referred to as "CB") and silica at a nano level and composing may be mentioned. As conductive silica, for example, what obtained by coating silica particles with conductive particles, such as CB, may be mentioned. As black silica, for example, natural ore containing graphite in silica may be mentioned.

As well as (B2), material of (B1) is not particularly limited and either of resin-type particles and inorganic-type particles may be used. As resin-type particles, for example, a melamine resin, bunzoguanamine resin, benzoguanamine/melamine/formalin condensate, acrylic resin, urethane resin, styrene resin, fluoric resin and silicon resin, etc. may be mentioned. As inorganic-type particles, silica, alumina, calcium carbonate, barium sulfate, titan oxide and CB, etc. may be mentioned. They may be used alone or in combination of two or more kinds.

As (B1), for example, CB added as a colorant/conductive agent may be also used. When using CB as (B1), a membrane to be formed is colored, so that an effect of reflection prevention is increased furthermore and a preferable antistatic effect can be obtained.

—(C)—

The (C) used for forming a composition is contained for the purpose of dissolving (A) and adjusting viscosity of the whole composition. When using (C), (A) and other component to be added as needed can be mixed more easily and uniformity of the composition is improved. Also, viscosity of the composition can be adjusted properly, so that, when forming a membrane on a surface of an object to be coated, operability of the composition and uniformity of a thickness when applying can be improved. As a result, it can contribute largely to enhance designability of a finally obtained product.

As (C), it is not particularly limited as long as it is a solvent capable of dissolving (A), and an organic solvent or water may be mentioned. As an organic solvent, for example, methylethylketone, toluene, propylene glycol monomethyl ether acetate, ethyl acetate, butyl acetate, methanol, ethanol, isopropyl alcohol and butanol, etc. may be used. They may be used alone or in combination of two or more kinds.

A content (total amount) of (C) in a composition is, with respect to 100 parts by mass of (A), preferably 1 part by mass or more, more preferably 3 parts by mass or more and preferably 20 parts by mass or less in order to obtain the effects of containing (C) as explained above.

—(D) Optional Component—

Other than the components (A), (B) and (C) above, the composition may contain (D) to an extent of not hindering the effects of the present invention. As (D), for example, a leveling agent, thickener, pH adjusting agent, lubricant, dispersant, defoaming agent, curing agent and reaction catalyst, etc. may be mentioned.

Particularly when using a thermosetting resin as (A), crosslinking of (A) can be accelerated by blending a curing agent. As a curing agent, a urea compound having a functional group, melamine compound, isocyanate compound, epoxy compound, aziridine compound and oxazoline compound, etc. may be mentioned. As a curing agent, isocyanate compound is preferable among them. The curing agent may be used alone or in combination of two or more kinds.

A ratio of blending a curing agent in a composition is, with respect to 100 parts by mass of (A), preferably 10 parts by mass or more and 80 parts by mass or less. When adding a curing agent in this range, hardness of a membrane to be formed is enhanced, consequently, characteristics of the membrane surface can be maintained for a long term even when the membrane is exposed to an environment of rubbing against other member, and low glossiness, a high light-shielding characteristic, low reflectance and high degree of blackness can be maintained easily.

When a curing agent is contained in a composition, a reaction catalyst may be used together so as to accelerate reaction of the curing agent with (A). As a reaction catalyst, for example, ammonia and aluminum chloride, etc. may be mentioned. A ratio of a reaction catalyst to be contained in the composition is, with respect to 100 parts by mass of a curing agent, preferably 0.1 part by mass or more and 10 parts by mass or less.

A composition according to one mode has viscosity at 25° C. of preferably 1 mPa·s or more, preferably 30 mPa·s or less and more preferably 20 mPa·s or less for the reason of coating by using a spray (spray coating) while maintaining smoothness of the composition on a surface of an object to be coated. When viscosity of the composition is too low, there is a possibility of not being able to form a membrane having a thickness sufficient to realize better designability. When viscosity of the composition is too high, it becomes difficult to spray the composition uniformly on a surface of an object to be coated, so that there is a possibility that a membrane having a uniform thickness with better designability cannot be obtained.

The viscosity differs depending on components contained in the composition, that is, kinds and molecular weights, etc. of (A) and (B) to be used. Also, when blending (D) in addition to the (A) and (B) above, it differs depending on a kind and molecular weight, etc. of (D). However, it can be adjusted easily by adjusting an amount of (C) in the composition in the range stated above.

A composition according to one mode of the present invention may be prepared (produced) by adding (A), (B) and, when needed, (D) to (C), and mixing and agitating. An order of mixing the respective components is not particularly limited as long as the components are mixed uniformly.

A composition according to one mode of the present invention may be one-liquid type or two-liquid type. When containing a curing agent as (D) in the composition, the composition according to one mode may be two-liquid type with, for example, a first liquid comprising components other than a curing agent and a second liquid comprising a curing agent.

A method of forming a membrane is not particularly limited. A membrane may be formed on an object to be coated by any method or by an apparatus, for example, spray coating (for example, air spray, airless spray and electrostatic spray, etc.), paint brush, curtain flow coating, roller brush coating, bar coating, kiss roll, metaling bar, gravure roll, reverse roll, dip coating and die coating may be used . . . .

Particularly, a composition according to one mode preferably forms a membrane by using spray coating, which requires spray of droplet from a small spray hole. In other words, a composition according to one mode is a composition for forming a membrane by using spray coating, and a membrane to be formed is a spray coated membrane.

According to spray coating using a composition according to one mode, droplets of the composition adhere successively to a surface of an object to be coated and, at the same time, volatilization of (C) in the droplets adhered to the object to be coated proceeds. As a result, a solid content (particles) obtained by removing (C) from droplets laminates successively on the surface of the object to be coated so as to form a solid particle laminate. According to one mode, this solid particle laminate configures a membrane.

In the case of using a composition comprising a thermosetting resin as (A) and furthermore comprising a curable agent as (D), it is preferable that a solid particle laminate is applied to a surface of an object to be coated and, after that, the laminate is heated to be cured. Here, even if a trace of (C) remains in the preheated laminate, it volatilizes almost completely by the heating.

Heating condition may be adjusted properly depending on a thickness of the preheat laminate and heat resistant characteristic of an object to be coated, etc. The heating condition is, for example, one minute or more and 10 minutes or less at 70° C. or more and 150° C. or less, and preferably 2 minutes or more and 5 minutes or less at 100° C. or more and 130° C. or less.

A thickness of the antireflection film 4 is not particularly limited as long as it is possible to suppress internal reflection on the inner wall surface **2*a*** and suppress flare or ghost due to the internal reflection. To mention an example of a preferable film thickness, it is preferably 2 μm or more, more preferably 5 μm or more and preferably 40 μm or less and more preferably 25 μm or less.

A thickness of the antireflection film 4 is a height including parts protruding, due to (B2) and (B1) in the membrane, from a surface of an object to be coated. An average thickness of a membrane can be measured by a method based on JIS K7130.

<Characteristics of Membrane>

Characteristics of a membrane formed from a composition according to one mode are as below.

(Glossiness, Reflectance, L value, Optical Density and Adhesiveness)

A surface of a membrane formed from a composition according to one mode preferably has 60°-glossiness of less than 1%, 85°-glossiness of less than 5%, reflectance of 4% or less, an L value of 22 or less and an optical density of 1.0 or more.

Here, when configured that a membrane formed from a composition according to one mode is exposed as an outermost surface, 60°-glossiness, 85°-glossiness, reflectance, an L value and optical density on a surface of the membrane are preferably in the ranges as above. When another membrane is coated on a membrane formed from a composition according to one mode, 60°-glossiness, 85°-glossiness, reflectance, an L value and an optical density on a surface of this another membrane (that is, an outermost surface of the lens hood) are preferably in the ranges as above. Hereinafter, these surfaces will be referred to as "an outermost surface of a membrane".

An outermost surface of a membrane formed from a composition according to one mode preferably has 60°-glossiness of less than 1%, 85°-glossiness of less than 5%, reflectance 4% or less, an L value 22 or less and an optical density of 1.0 or more. When 60°-glossiness, 85°-glossiness, reflectance, an L value and an optical density on an outermost surface of a membrane are in the ranges as above, it is possible to attain low glossiness, low reflectance (excellent antireflection characteristic. It will be the same below), a high blackness degree and a high light-shielding characteristic on the outermost surface of the membrane.

The uppermost value of 60°-glossiness is more preferably less than 0.8% and furthermore preferably less than 0.5%. When 60°-glossiness is adjusted to be in the range above, a flare ghost phenomenon due to irregular reflection of lights can be prevented effectively. A lower limit value of 60°-glossiness is not particularly limited, and the lower the better.

The uppermost value of 85°-glossiness is more preferably less than 3.5% and furthermore preferably less than 2.5%. When 85°-glossiness is adjusted to be in the range above, a flare ghost phenomenon can be prevented, angle dependency is eliminated and an advantage of enhancing designability can be obtained more easily. A lower limit value of 85°-glossiness is not particularly limited, and the lower the better.

An uppermost value of reflectance is more preferably 3% or less and furthermore preferably 2.5% or less. A lower limit value of reflectance is not particularly limited. The lower the reflectance is, the better. When reflectance is adjusted to be in the range above, a flare ghost phenomenon due to irregular reflection of lights (internal reflection) can be prevented furthermore effectively.

An uppermost value of an L value (blackness degree) is more preferably 20 or less and furthermore preferably 18 or less. A lower limit value of an L value is not particularly limited. However, in terms of demands for real blackness on appearance, the lower, the better. When an L value is adjusted to be in the range above, the blackness is enhanced and blackness outstands so as to attain excellent designability, therefore, a higher appearance quality can be maintained even when it is provided at a position able to be seen by users.

The L value above is a lightness L*value on an outermost surface of a membrane, which is in CIE 1976 L*a*b* (CIELAB) color space system based on a SCE method. The SCE method is a specularly reflected light removal method, which means a method of measuring color by removing specularly reflected lights. Definition of the SCE method is defined in JIS Z8722 (2009). Since specularly reflected lights are removed in the SCE method, the color is close to the color actually viewed by human.

CIE is abbreviation of Commission Internationale de l'Eclairage, which means international committee on illumination. The CIELAB color space was adopted in 1976 in order to measure color difference between perception and devices and is a uniform color space defined in JIS Z 8781 (2013). Three coordinates in CIELAB are indicated by L*value, a*value and b*value. The L*value indicates lightness and expressed from 0 to 100. When L*value is 0, it indicates black, while it indicates white diffusion color when L*value is 100. The a*value indicates colors between red and green. When a*value is in minus, it indicates colors close to green, while when in plus, it indicates colors close to red. The b*value indicates colors between yellow and blue. When b*value is in minus, it indicates colors close to blue, while it indicates colors close to yellow when in plus.

A lower limit value of an optical density is more preferably 1.5 or more and furthermore preferably 2.0 or more. When optical density is adjusted to be in the range above, a light-shielding characteristic can be enhanced furthermore. An upper limit value of an optical density is not particularly limited, and the higher the better.

The glossiness, reflectance, an L value and optical density explained above can be measured by methods explained later on.

In addition to the characteristics (glossiness, reflectance, an L value and optical density) above, a membrane formed from a composition preferably has good adhesiveness to a surface of an object to be coated. Adhesiveness of a membrane formed from a composition to a surface of an object to be coated preferably satisfies that 75% or more of the coating remain as explained in adhesiveness evaluation in later-explained examples.

(Rz, Rsm, Rsk, Rku and Ra)

In a membrane formed from a composition according to one mode, it is preferable that a maximum height Rz is 7 μm or more, an average length Rsm of contour curve element is 80 μm or more, skewness Rsk of contour curve is 0.3 or less and Kurtosis Rku of a contour curve is 3 or more. When Rz, Rsm, Rsk and Rku are in the ranges above on the uppermost surface, glossiness, optical density, reflectance and an L value on the outermost surface of a membrane can become in the ranges above (60°-glossiness of less than 1%, 85°-glossiness of less than 5%, reflectance of 4% or less, an L value of 22 or less and optical density of 1.0 or more), consequently, low glossiness, low reflectance, a high blackness degree and a high light-shielding characteristic on the outermost surface of a membrane can be attained.

The lower limit value of Rz is more preferably 10 μm or more. When the lower limit value of Rz is as above, low glossiness, low reflectance and high light-shielding characteristic can be adjusted furthermore easily.

An upper limit value of Rz is not particularly limited but is preferably 50 μm or less and more preferably 30 μm or less. When an upper limit value of Rz is as above, furthermore lower glossiness, a higher light-shielding characteristic, lower reflectance and higher blackness degree on the outermost surface of a membrane can be attained easily.

The Rsm indicates an average length of contour curve elements within a standard length. A lower limit value of Rsm is more preferably 100 μm or more and furthermore preferably 120 μm or more. When a lower limit value of Rsm is as above, an advantage of low glossiness can be attained furthermore easily. An upper limit value of Rsm is not particularly limited, but preferably 160 μm or less. In this range, furthermore excellent adhesiveness between an object to be coated and a membrane to be formed thereon can be obtained.

The Rsk is an average of the cubes of a height Z(x) in a dimentionless reference length obtained by a root mean square height (Zq) cubed, which is an index indicating deviation from an average line of uneven shape, that is, a degree of strain, on an outermost surface of a membrane. There is a tendency that when Rsk value is in plus (Rsk>0), the uneven shape is deviated to the concave side, so that protruding shape becomes sharp. On the other hand, when in minus (Rsk<0), the uneven shape is deviated to the convex side, so that protruding shape becomes dull. When the protruding shape of contour curve is dull, haze becomes low comparing with that in the case with a sharp shape.

An upper limit value of Rsk is more preferably 0.2 or less. When an upper limit value of Rsk is as above, an advantage of low glossiness can be obtained furthermore easily. A lower limit value of Rsk is not particularly limited but is preferably 0 or more. When a lower limit value of Rsk is as above, an advantage of low glossiness can be obtained easily.

The Rku indicates an average of the fourth-power of a height Z(x) in a dimentionless reference length obtained by the four-power of a root-mean-square height (Zq), and is an index indicating a degree of sharpness at tips of unevenness on an outermost surface of a membrane. When Rku is larger, there are more sharp tips on unevenness, so that an inclined angle close to tips of unevenness becomes larger while inclined angles of other parts become smaller, so that reflection of background tends to arise.

A lower limit value of Rku is more preferably 3.3 or more. When a lower limit value of Rku is as above, an advantage of low glossiness can be obtained more easily. An upper limit value of Rku is not particularly limited, but is preferably 5 or less. When an upper limit value of Rku is as above, an advantage of low glossiness can be obtained more easily.

In a membrane formed from a composition according to one mode, an arithmetic average roughness (Ra) on an outermost surface is preferably 0.5 μm or more, more preferably 1.0 μm or more and furthermore preferably 1.5 μm or more.

Those Rz, Rsm, Rsk, Rku and Ra on an outermost surface of a membrane as explained above can be measured and calculated based on JIS B0601:2001.

(Other Modes)

The antireflection film 4 in the one mode explained above can be formed on an inner wall surface of the hood body 2 directly without any pretreatment or via a pretreatment layer, however, it is not limited to this mode. For example, it may be a mode of preparing a sheet of an antireflection film obtained by forming an antireflection film 4 by spray coating on an extremely thin plastic film (PET film, etc.), cutting the sheet to fit a shape of the inner wall surface of the hood body 2 so as to obtain a sheet piece, then, applying the sheet piece to the inner wall surface of the hood body 2 via an adhesive layer and, finally, forming an antireflection film 4 on the inner wall surface of the hood body 2.

Alternately, a lens hood 1 in the one mode explained above is on an assumption of being a transaction object separately from photographic lenses, however, it is not limited to this mode. Specifically, in the case where a photographic lens is a fish-eye lens or a super wide-angle lens, it is difficult to attach a lens cap for covering the lens surface, so that a lens hood 1 is supplied integrally with the photographic lens for the purpose of protecting the lens surface instead of a lens cap (lens hood integrated type photographic lens) in some cases. Namely, it includes the case where the lens hood 1 is integrated with the photographic lens to be a transaction object.

As the case of supplying a lens hood 1 integrally with a photographic lens, a camera unit of a variety of image pickup apparatuses (for example, a cellular phone, smartphone, PDA (Personal Digital Assistant) and portable game device, etc.) may be mentioned.

EXAMPLES

Below, the present invention will be explained specifically based on examples (including modes and comparative examples), however, the present invention is not limited to the examples. Below, "part" indicates "part by mass" and "%" indicates "% by mass"

[Components of Composition]

As A (a resin component), a substance below was prepared.

A1: thermosetting acrylic resin (ACRYDIC A-801PRODUCED BY DIC, solid content 50%)

As B1 (small particles) falling under B (unevenness forming particles), substances below were prepared.

B1a: carbon black (CB) (particle diameter 150 nm)

(MHI Black #273 produced by MIKUNI Color Ltd., CB content 9.5%)

B1b: transparent silica (particle diameter 58 nm)

(ACEMATT R972 produced by EVONIK)

As B2 (large particles) falling under B, substances below were prepared.

B2a: composite silica (particle diameter 3 μm)

(BECSIA ID produced by Fuji Silysia Chemical Ltd.)

B2b: black acrylic beads (particle diameter 3 μm)

(RUBCOULEUR 224SMD black produced by Dainichiseika Color & Chemicals Mfg Co., Ltd.)

B2c: transparent silica (particle diameter 4.1 μm)

(SYLYSIA 430 produced by Fuji Silysia Chemical Ltd.)

B2d: transparent silica (particle diameter 8 μm)

(SYLYSIA 450 produced by Fuji Silysia Chemical Ltd.)

B2e: transparent acrylic beads (particle diameter 3 μm)

(ENEOS Uni-Powder NMB-0320C produced by ENEOS Corporation)

Note that BECSIAID used as B2a (complex silica) is complex particles of CB and silica, wherein CB/silica= about 25/75 (mass ratio). The MHI black #273 used as B1a (CB) is a CB dispersant and, in a solid content total amount 18% of the dispersant, 9.5% is CB and remaining 8.5% is other compounds. In the 8.5% of remaining compounds, 3% is a copper compound and 5.5% is an acrylic resin.

As D (optional component), a substance below was prepared.

D1: isocyanate compound (TAKENATE D110N Produced by Mitsui Chemicals, Inc., Solid Content 75%)

[Object to be Coated]

As an object to be coated, a substrate for samples for evaluation was prepared. As a substrate for samples for evaluation, a black polycarbonate sheet material was used and rectangular-shaped polycarbonate plates (100 mm in the longitudinal length, 50 mm in width and 1.5 mm in thickness) produced to be matte finish on both surfaces of the plate in the thickness (X) direction were prepared.

Examples 1 to 17

1. Preparation of Compound

Respective components for each example with each solid content ratio shown in Table 1 were prepared, so that a total solid content becomes approximately 25% by mass, and added to a necessary amount of (C) a diluent solvent, which is a mixed solvent (methylethyl ketone: butyl acetate=50:

50), and agitated to mix, and a liquid composition (hereinafter, also simply referred to as "a liquid") was prepared.

2. Production of Samples for Evaluation

Each liquid obtained for each of the examples was sprayed toward an outer surface of an object to be coated by spray coating in the same method as explained in (3-1) Coating Performance below. Then, the resultant was heated at 120° C. for 3 minutes to dry, and a solid particle laminate was formed by spray coating and heated to be a coating (hereinafter, also simply referred to as "a coating") having an average membrane thickness of 20 μm on a surface of the object to be coated, so that samples for evaluation were obtained.

3. Evaluation

On each liquid obtained in each of the examples, a variety of characteristics (coating performance) were evaluated (liquid evaluation) in the methods explained below. Also, on each coating formed on each sample for evaluation obtained in each of the examples, a variety of characteristics (characteristics and surface properties) were evaluated in the methods explained below (evaluation on samples). The results are shown in Table 1.

[Liquid Evaluation]

(3-1) Coating Performance

Coating performance of a liquid was evaluated by observing coating uniformity after coating by spray coating. Each liquid was poured in an air spray configured by attaching an air brush (Spray-Work HG Single Airbrush produced by TAMIYA, Inc.) to an air can (Spray-Work Air Can 420D produced by TAMIYA, Inc.), sprayed toward an outer surface of an object to be coated for 10 seconds from a 10 cm distance from a tip of the air brush, and a formed solid particle laminate was evaluated its coating uniformity visually. Evaluation reference is as below.

○: Lack of coating uniformity (lack of uniformity in thickness) was not observed.

Δ: Lack of coating uniformity was observed partially.

x: Lack of coating uniformity was observed in many areas.

[Sample Evaluation]

(3-2) Characteristics

—Glossiness—

Glossiness against a measurement light having an incident angle of 60° (specular glossiness at) 60° and glossiness against a measurement light having an incident angle of 85° (specular glossiness at) 85° on a surface of a coating formed on each sample for evaluation were measured on 9 spots by using a glossmeter (VG 7000 produced by NIPPON DENSHOKU Industries Co., Ltd.) by the method based on JIS Z8741, and an average value thereof was adopted as a glossiness degree. Evaluation reference is as below.

(Specular Glossiness at 60°)

◎: less than 0.8% (extremely excellent)

○: 0.8% or more but less than 1% (excellent)

x: 1% or more (Specular Glossiness at 85°)

◎: less than 3.5% (extremely excellent)

○: 3.5% or more but less than 4% (excellent)

x: 4% or more (Comprehensive Evaluation on Glossiness)

◎: The respective evaluation on specular glossiness at 60° and that at 85° were all ◎(extremely preferable low glossiness).

○: At least one of the respective evaluation on specular glossiness at 60° and that at 85° was ○ and none of them was x (preferable low glossiness).

x: At least one of the respective evaluation on specular glossiness at 60° and that at 85° was x (not low enough glossiness).

—Reflectance—

Reflectance against a light having a wavelength from 400 nm to 700 nm on a surface of coating formed on each sample for evaluation was measured at 9 spots at 1 nm intervals by using a spectral colorimeter (CM-5 produced by Konica Minolta Inc.) by the method based on JIS Z8722, and an average value thereof was adopted as reflectance. Evaluation reference is as below.

◎: Reflectance was 3% or less. (extremely preferable low reflectance)

○: Reflectance exceeds 3% but 4% or less. (preferable low reflectance)

x: Reflectance exceeded 4%. (not low enough reflectance)

—Blackness Degree—

A degree of blackness on a surface of a coating formed on each sample for evaluation was evaluated by measuring lightness L*value in CIE 1976 L*a*b* (CIELAB) color space system on the surface by the SCE method. The lightness L*value was measured by using a spectral colorimeter (CM-5 produced by Konica Minolta Inc.) by the method based on JIS Z8781-4:2013. Evaluation reference is as below.

When measuring, a CIE standard light source D65 was used as a light source and L*value in the CIELAB color space system was obtained at a viewing angle of 10° by the SCE method. The CIE standard light source D65 is defined in JIS Z8720 (2000) "Standard Illuminants and Sources for Colorimetry", and ISO 10526 (2007) also shows the same definition. The CIE standard light source D65 is used in the case of displaying colors of an object illuminated by daylight. A viewing angle of 10° is defined in JIS Z8723 (2009) "Methods of Visual Comparison for Surface Colours", and ISO/DIS 3668 also shows the same definition.

◎: An L value was 20 or less. (extremely high degree of blackness)

○: An L value exceeded 20 but 22 or less. (high degree of blackness)

x: An L value exceeded 22. (insufficient degree of blackness)

—Light-Shielding Characteristic—

A light-shielding characteristic of a coating formed on each sample for evaluation was evaluated by calculating optical density of the coating. Optical density of a coating formed on each sample was obtained by using an optical density meter (X-rite 361T (ortho filter) produced by Nihon Heihan Kizai Kabushiki Kaisha), irradiating a vertical transmission light flux to the coated film side of a sample, and calculating by expressing a ratio with respect to a state without a coating film in log (logarithms). An optical density of 6.0 or more is an upper limit value of detection in the measurement. Evaluation reference is as below.

◎: Optical density was 1.5 or more. (extremely preferable light-shielding characteristic)

○: Optical density was 1.0 or more but less than 1.5. (preferable light-shielding characteristic)

x: Optical density was less than 1.0. (insufficient light-shielding characteristic)

—Adhesiveness—

Adhesiveness of a coating film formed on each sample for evaluation to a surface of an object to be coated was evaluated by cutting the coating film in a grid pattern with a market-available cutter, putting thereon a cellophane tape (Cellulose tape produced by NICHIBAN Co., Ltd.), then taking off the tape, and visually observing a remaining state of the coating film. Evaluation reference is as below.

◎: A coating film remained 100%. (extremely high adhesiveness)

○: A coating film remained 75% or more and less than 100%. (high adhesiveness)

x: A coating film remained less than 75%. (insufficient adhesiveness)

—Comprehensive Evaluation—

Glossiness, reflectance, a blackness degree, a light-shielding characteristic and adhesiveness as above were evaluated comprehensively. Evaluation reference is as below.

◎: Evaluation on glossiness, evaluation on reflectance, evaluation on blackness degree, evaluation on a light-shielding characteristic and evaluation on adhesiveness were all ◎.

○: At least one of the evaluation on glossiness, evaluation on reflectance, evaluation on a blackness degree, evaluation on a light-shielding characteristic and evaluation on adhesiveness was ○, and none of them was x.

x: At least one of the evaluation on glossiness, evaluation on reflectance, evaluation on a blackness degree, evaluation on a light-shielding characteristic and evaluation on adhesiveness was x.

(3-3) Surface Properties

—Rz Value, Rsm Value, Rsk Value, Rku Value and Ra Value—

Properties (Rz value, Rsm value, Rsk value, Rku value and Ra value) of a surface of a coating film formed on each sample for evaluation was measured by using a surface roughness measuring device (SURFCOM 480B produced by TOKYO SEIMITSU Co., Ltd.) based on JIS B0601: 2001. Evaluation reference is as below.

(Rz)

◎: Rz was 10 μm or more. (extremely preferable)

○: Rz was 7 μm or more but less than 10 μm. (preferable)

x: Rz was less than 7 μm. (defective)

(Rsm):

◎Rsm was 120 μm or more. (extremely preferable)

○: Rsm was 80 μm or more but less than 120 μm. (preferable)

x: Rsm was less than 80 μm. (defective)

(Rsk)

◎: Rsk was 0.2 or less. (extremely preferable)

○: Rks exceeded 0.2 but 0.3 or less. (preferable)

x: Rsk exceeded 0.3. (defective)

(Rku)

◎: Rku was 3.3 or more. (extremely preferable)

○: Rku was 3 or more but less than 3.3. (preferable)

x: Rku was less than 3. (defective)

(Ra)

◎: Ra was 1.5 μm or more. (extremely preferable)

○: Ra was 0.5 μm or more but less than 1.5 μm. (preferable)

x: Ra was less than 0.5 μm. (defective)

TABLE 1

| COMPONENTS | | | | | EXAMPLES 1 | 2 | 3 | 4 | 5 | 6 |
|---|---|---|---|---|---|---|---|---|---|---|
| LIQUID COMPOSITION | A | A1 | | ACRYLIC RESIN | 60 | 60 | 60 | 60 | 60 | 60 |
| | D | D1 | | ISOCYANATE COMPOSITION | 40 | 40 | 40 | 40 | 40 | 40 |
| | B | B1 | B1a | CARBON BLACK(150 nm) | 20.0 | 19.0 | 15.0 | 13.0 | 12.0 | 15.0 |
| | | | B1b | TRANSPARENT SILICA(56 nm) | — | — | — | — | — | — |
| | | B2 | B2a | COMPLEX SILICA(3 μm) | 35.0 | 36.0 | 40.0 | 42.0 | 43.0 | — |
| | | | B2b | BLACK ACRYLIC BEADS(3 μm) | — | — | — | — | — | 40.0 |
| | | | B2c | TRANSPARENT SILICA(4.1 μm) | — | — | — | — | — | — |
| | | | B2d | TRANSPARENT SILICA(8 μm) | — | — | — | — | — | — |
| | | | B2e | TRANSPARENT ACRYLIC BEADS(3 μm) | — | — | — | — | — | — |
| | | ※B1:B2 = 1:●(MASS RATIO) | | | 1.75 | 1.89 | 2.67 | 3.23 | 3.58 | 2.67 |
| | | ※(A + B + D):B = 100:●(MASS RATIO) | | | 35.5 | 35.5 | 35.5 | 35.5 | 35.5 | 35.5 |
| PROPERTY EVALUATION | LIQUID | COATING PERFORMANCE | | | ○ | ○ | ○ | ○ | ○ | ○ |
| | MEMBRANE CHARACTERISTICS | GLOSSINESS (SPECULAR GLOSSINESS AT 60°) | | | ○ | ○ | ◎ | ◎ | ◎ | ○ |
| | | GLOSSINESS (SPECULAR GLOSSINESS AT 85°) | | | ○ | ○ | ◎ | ◎ | ◎ | ○ |
| | | COMPREHENSIVE GLOSSINESS | | | ○ | ○ | ◎ | ◎ | ◎ | ○ |
| | | REFLECTANCE (ANTIREFLECTION CHARACTERISTIC) | | | ○ | ○ | ◎ | ◎ | ◎ | ○ |
| | | L VALUE(L*VALUE IN CIELAB COLOR SPACE SYSTEM) | | | x | ○ | ◎ | ◎ | ◎ | x |
| | | LIGHT-SHIELDING CHARACTERISTIC | | | ◎ | ◎ | ◎ | ○ | x | ○ |
| | | ADHESIVENESS | | | ◎ | ◎ | ◎ | ○ | x | ◎ |
| | | ※COMPREHENSIVE EVALUATION ON MEMBRANE CHARACTERISTICS | | | x | ○ | ◎ | ○ | x | x |
| | MEMBRANE PROPERTIES | Rz | | | x | ○ | ◎ | ◎ | ◎ | ○ |
| | | Rsm | | | ○ | ○ | ◎ | ◎ | ◎ | ○ |
| | | Rsk | | | x | ○ | ◎ | ○ | ○ | ○ |
| | | Rku | | | ◎ | ◎ | ◎ | ○ | ○ | ○ |
| | | Ra | | | ○ | ○ | ◎ | ◎ | ◎ | ○ |

| COMPONENTS | | | | | EXAMPLES 7 | 8 | 9 | 10 | 11 | 12 |
|---|---|---|---|---|---|---|---|---|---|---|
| LIQUID COMPOSITION | A | A1 | | ACRYLIC RESIN | 60 | 60 | 60 | 60 | 60 | 60 |
| | D | D1 | | ISOCYANATE COMPOSITION | 40 | 40 | 40 | 40 | 40 | 40 |
| | B | B1 | B1a | CARBON BLACK(150 nm) | 15.0 | 15.0 | 15.0 | — | 15.0 | — |
| | | | B1b | TRANSPARENT SILICA(56 nm) | — | — | — | 15.0 | 40.0 | 15.0 |
| | | B2 | B2a | COMPLEX SILICA(3 μm) | — | — | — | 40.0 | — | — |
| | | | B2b | BLACK ACRYLIC BEADS(3 μm) | — | — | — | — | — | 40.0 |

TABLE 1-continued

| | | | | | | | | | |
|---|---|---|---|---|---|---|---|---|---|
| | | B2c | TRANSPARENT SILICA(4.1 μm) | — | 40.0 | | — | — | — |
| | | B2d | TRANSPARENT SILICA(8 μm) | — | — | 40.0 | — | — | — |
| | | B2e | TRANSPARENT ACRYLIC BEADS(3 μm) | 40.0 | — | — | — | — | — |
| | | ※B1:B2 = 1:●(MASS RATIO) | | 2.67 | 2.67 | 2.67 | 2.67 | 2.67 | 2.67 |
| | | ※(A + B + D):B = 100:●(MASS RATIO) | | 35.5 | 35.5 | 35.5 | 35.5 | 35.5 | 35.5 |
| PROPERTY EVALUATION | LIQUID MEMBRANE CHARACTERISTICS | COATING PERFORMANCE | | ○ | ○ | ○ | ○ | ○ | ○ |
| | | GLOSSINESS (SPECULAR GLOSSINESS AT 60°) | | ○ | ○ | ◎ | ○ | x | ○ |
| | | GLOSSINESS (SPECULAR GLOSSINESS AT 85°) | | ○ | ◎ | ◎ | ○ | x | ○ |
| | | COMPREHENSIVE GLOSSINESS | | ○ | ○ | ◎ | ○ | x | ○ |
| | | REFLECTANCE (ANTIREFLECTION CHARACTERISTIC) | | ○ | ○ | ○ | ○ | x | ○ |
| | | L VALUE(L*VALUE IN CIELAB COLOR SPACE SYSTEM) | | x | ○ | x | ○ | x | x |
| | | LIGHT-SHIELDING CHARACTERISTIC | | x | ○ | x | ○ | ○ | x |
| | | ADHESIVENESS | | ◎ | ◎ | x | ◎ | x | ○ |
| | | ※COMPREHENSIVE EVALUATION ON MEMBRANE CHARACTERISTICS | | x | ○ | x | ○ | x | x |
| | MEMBRANE PROPERTIES | Rz | | ○ | ○ | ○ | ○ | x | ○ |
| | | Rsm | | ○ | ○ | ○ | ○ | x | x |
| | | Rsk | | ○ | ○ | ○ | ○ | x | x |
| | | Rku | | ○ | ○ | ○ | ○ | x | x |
| | | Ra | | ○ | ○ | ○ | ○ | x | ○ |

| COMPONENTS | | | | | EXAMPLES | | | | | |
|---|---|---|---|---|---|---|---|---|---|---|
| | | | | | 13 | 14 | 3 | 15 | 16 | 17 |
| LIQUID COMPOSITION | A | A1 | | ACRYLIC RESIN | 60 | 60 | 60 | 60 | 60 | 60 |
| | D | D1 | | ISOCYANATE COMPOSITION | 40 | 40 | 40 | 40 | 40 | 40 |
| | B | B1 | B1a | CARBON BLACK(150 nm) | 5.0 | 10.0 | 15.0 | 25.0 | 35.0 | 45.0 |
| | | | B1b | TRANSPARENT SILICA(56 nm) | — | — | — | — | — | — |
| | | B2 | B2a | COMPLEX SILICA(3 μm) | 16.0 | 19.0 | 40.0 | 62.0 | 80.0 | 120.0 |
| | | | B2b | BLACK ACRYLIC BEADS(3 μm) | — | — | — | — | — | — |
| | | | B2c | TRANSPARENT SILICA(4.1 μm) | — | — | — | — | — | — |
| | | | B2d | TRANSPARENT SILICA(8 μm) | — | — | — | — | — | — |
| | | | B2e | TRANSPARENT ACRYLIC BEADS(3 μm) | — | — | — | — | — | — |
| | | ※B1:B2 = 1:●(MASS RATIO) | | | 3.20 | 1.90 | 2.67 | 2.48 | 2.29 | 2.67 |
| | | ※(A + B + D):B = 100:●(MASS RATIO) | | | 17.4 | 22.5 | 35.5 | 46.5 | 53.5 | 62.3 |
| PROPERTY EVALUATION | LIQUID MEMBRANE CHARACTERISTICS | COATING PERFORMANCE | | | ○ | ○ | ○ | ○ | ○ | ○ |
| | | GLOSSINESS (SPECULAR GLOSSINESS AT 60°) | | | x | ○ | ◎ | ○ | ○ | ○ |
| | | GLOSSINESS (SPECULAR GLOSSINESS AT 85°) | | | x | ○ | ◎ | ◎ | ◎ | ○ |
| | | COMPREHENSIVE GLOSSINESS | | | x | ○ | ◎ | ○ | ○ | ○ |
| | | REFLECTANCE (ANTIREFLECTION CHARACTERISTIC) | | | x | ○ | ◎ | ○ | ○ | ○ |
| | | L VALUE(L*VALUE IN CIELAB COLOR SPACE SYSTEM) | | | x | ○ | ◎ | ○ | ○ | ○ |
| | | LIGHT-SHIELDING CHARACTERISTIC | | | x | ○ | ◎ | ○ | ○ | ○ |
| | | ADHESIVENESS | | | ◎ | ◎ | ◎ | ○ | ○ | x |
| | | ※COMPREHENSIVE EVALUATION ON MEMBRANE CHARACTERISTICS | | | x | ○ | ◎ | ○ | ○ | x |
| | MEMBRANE PROPERTIES | Rz | | | x | ○ | ◎ | ◎ | ◎ | ◎ |
| | | Rsm | | | x | ○ | ◎ | ◎ | ◎ | ◎ |
| | | Rsk | | | x | ○ | ◎ | ◎ | ○ | ○ |
| | | Rku | | | x | ○ | ◎ | ◎ | ○ | ○ |
| | | Ra | | | x | ○ | ◎ | ◎ | ◎ | ◎ |

4. Consideration

As shown in Table 1, when a liquid for forming membrane did not comprise as (B) one or more of (B1) and (B2) (Examples 6, 7, 9, 11 and 12), at least one of the membrane characteristics of glossiness, reflectance, L value, light-shielding characteristic and adhesiveness was not satisfied. On the other hand, even both of (B1) and (B2) were contained as (B) in the liquid (Examples 1 to 5, 8 and 10), when mass ratio of (B2) with respect to (B1):1 was 1.75 or less (Example 1) or 3.58 or more (Example 5), at least one of an L value and adhesiveness as membrane characteristics was not satisfied. Even if both of (B1) and (B2) are contained and a mass ratio of (B2) with respect to (B1): 1 was in a proper range (exceeding 1.75 but less than 3.58) (Examples 2 to 4 and 13 to 17), when a content (total amount) of (B) in 100% by mass of a total solid content was less than 20% by mass (Example 13) or exceeding 60% by mass (Example 17), one or more of viscosity of a liquid and membrane characteristics of glossiness, reflectance, an L value, light-shielding characteristic and adhesiveness was not satisfied.

On the other hand, when a mass ratio of (B2) with respect to (B1): 1 was exceeding 1.75 and less than 3.58 and a total content of (B) with respect to a total solid amount of 100% by mass in a composition was 20% by mass or more and 60% by mass or less (Examples 2 to 4, 8, 10 and 14 to 16), coating performance and membrane characteristics, and membrane properties were all satisfied.

DESCRIPTION OF NUMERICAL NOTATIONS

1 . . . Lens Hood
2 . . . Hood Body
**2*a*** . . . Inner Wall Surface
4 . . . Antireflection Film

The invention claimed is:

1. A lens hood attached to a photographic lens on a side of a photography subject for shielding an unnecessary light entering to the photographic lens: wherein an inner wall surface of a hood body has an antireflection film;

the antireflection film is configured by a membrane composed of a laminate of a solid particle formed from a liquid composition and having a thickness of 2 μm or more and 40 μm or less;

the solid particle comprises at least (A) and (B), wherein (B) is contained in an amount of 20% by mass or more and 60% by mass or less in a total amount of 100% by mass of the solid particle;

(B) comprises (B1) having a particle diameter ($d_1$) of 0.05 μm or more and 0.4 μm or less and (B2) having a particle diameter ($d_2$) of 2 μm or more and 6 μm or less in an amount of 90% by mass or more, and a mass ratio of (B2) with respect to (B1):1 is 1.8 or more and 3.3 or less;

(A) is a resin component;

(B) is unevenness forming particles;

(B1) is inorganic-type small particles; and (B2) is inorganic-type large particles.

2. The lens hood according to claim 1, wherein (B1) comprises carbon black.

3. The lens hood according to claim 2, wherein, on an outermost surface of a surface formed with a membrane, glossiness against an incident light with an incident angle of 60° is less than 1%, glossiness against an incident light with an incident angle of 85° is less than 5%, reflectance against a light having a wavelength of 550 nm is 4% or less, an L value in CIELAB color space system by SCE method of 22 or less, and an optical density is 1.0 or more.

4. The lens hood according to claim 3, on an outermost surface of a surface formed with a membrane, a maximum height Rz based on JIS B0601: 2001 is 7 μm or more, an average length Rsm of contour curve elements is 80 μm or more, a skewness Rsk of a contour curve is 0.3 or less, and Kurtosis of a contour curve Rku is 3 or more.

5. The lens hood according to claim 1, wherein, on an outermost surface of a surface formed with a membrane, glossiness against an incident light with an incident angle of 60° is less than 1%, glossiness against an incident light with an incident angle of 85° is less than 5%, reflectance against a light having a wavelength of 550 nm is 4% or less, an L value in CIELAB color space system by SCE method of 22 or less, and an optical density is 1.0 or more.

6. The lens hood according to claim 5, on an outermost surface of a surface formed with a membrane, a maximum height Rz based on JIS B0601: 2001 is 7 μm or more, an average length Rsm of contour curve elements is 80 μm or more, a skewness Rsk of a contour curve is 0.3 or less, and Kurtosis of a contour curve Rku is 3 or more.

7. The lens hood according to claim 1, wherein (B2) comprises at least one selected from a group consisting of a composite silica obtained by synthesizing carbon black and silica at a nano level, a conductive silica and a black silica.

8. The lens hood according to claim 7, wherein (B1) comprises carbon black.

9. The lens hood according to claim 7, wherein the particle diameter ($d_2$) of (B2) is 10 times or more and 40 times or less the particle diameter (d1) of (B1).

10. The lens hood according to claim 7, wherein (B) contains unevenness forming particles other than (B1) and (B2), a particle diameter (dmax) of the unevenness forming particles having the maximum particle diameter is 10 times or more and 40 times or less a particle diameter (dmin) of the unevenness forming particles having the minimum particle diameter.

11. The lens hood according to claim 7, wherein (A) comprises an acrylic resin.

12. The lens hood according to claim 1, wherein the particle diameter ($d_2$) of (B2) is 10 times or more and 40 times or less the particle diameter ($d_1$) of (B1).

13. The lens hood according to claim 1, wherein (B) contains unevenness forming particles other than (B1) and (B2), a particle diameter (dmax) of the unevenness forming particles having the maximum particle diameter is 10 times or more and 40 times or less a particle diameter (dmin) of the unevenness forming particles having the minimum particle diameter.

14. The lens hood according to claim 1, wherein (A) comprises an acrylic resin.

15. An antireflection film to be formed on an inner wall surface of a lens hood, configured by a membrane composed of a laminate of a solid particle formed from a liquid composition and having a thickness of 2 μm or more and 40 μm or less: wherein the solid particle comprises at least (A) and (B), wherein (B) is contained in an amount of 20% by mass or more and 60% by mass or less in a total amount of 100% by mass of the solid particle;

(B) comprises (B1) having a particle diameter ($d_1$) of 0.05 μm or more and 0.4 μm or less and (B2) having a particle diameter ($d_2$) of 2 μm or more and 6 μm or less in an amount of 90% by mass or more, and a mass ratio of (B2) with respect to (B1): 1 is 1.8 or more and 3.3 or less;

(A) is a resin component;

(B) is unevenness forming particles;

(B1) is inorganic-type small particles; and (B2) is inorganic-type large particles.

* * * * *